(12) United States Patent
Chang et al.

(10) Patent No.: US 9,304,684 B2
(45) Date of Patent: Apr. 5, 2016

(54) METHOD AND APPARATUS FOR SELECTING MEDIA FILES

(71) Applicant: COREL CORPORATION, Ottawa (CA)

(72) Inventors: Chien-Chuan Chang, Taipei (TW); Ming-Huang Lin, Taipei (TW)

(73) Assignee: COREL CORPORATION, Ottawa (CA)

( * ) Notice: Subject to any disclaimer, the term of this patent is extended or adjusted under 35 U.S.C. 154(b) by 133 days.

(21) Appl. No.: 13/859,165

(22) Filed: Apr. 9, 2013

(65) Prior Publication Data
US 2013/0232438 A1    Sep. 5, 2013

Related U.S. Application Data

(62) Division of application No. 11/832,655, filed on Aug. 2, 2007, now Pat. No. 8,416,221.

(30) Foreign Application Priority Data

Apr. 24, 2007    (CN) .......................... 2007 1 0102630

(51) Int. Cl.
| | | |
|---|---|---|
| *G06F 15/00* | (2006.01) | |
| *G06F 13/00* | (2006.01) | |
| *G06F 3/0488* | (2013.01) | |
| *G06F 3/0484* | (2013.01) | |
| *H04N 5/44* | (2011.01) | |
| *H04N 9/82* | (2006.01) | |
| *H04N 21/482* | (2011.01) | |

(52) U.S. Cl.
CPC ........ *G06F 3/04886* (2013.01); *G06F 3/04842* (2013.01); *H04N 5/4403* (2013.01); *H04N 9/8227* (2013.01); *H04N 21/482* (2013.01); *H04N 2005/4416* (2013.01)

(58) Field of Classification Search
CPC .......................... G06F 3/04886; G06F 3/04842
USPC .......................... 715/823, 784, 773, 851, 764
See application file for complete search history.

(56) References Cited

U.S. PATENT DOCUMENTS

| | | |
|---|---|---|
| 5,414,811 A | 5/1995 | Parulski et al. |
| 5,758,049 A | 5/1998 | Johnson et al. |

(Continued)

OTHER PUBLICATIONS

Schewe, Jeff; Adobe Lightroom Beta 3 Released, 2006, available at http://web.archive.org/web20060702071301/http://photoshopnews.com/2006/06/12/adobe.lightroom-beta-3-released.

(Continued)

*Primary Examiner* — Kevin Nguyen
(74) *Attorney, Agent, or Firm* — The Law Office of Michael E. Kondoudis

(57) ABSTRACT

A method and an apparatus for selecting media files are provided. In the present invention, three keys are used for selecting a plurality of media files, wherein one of the keys is used for rotating and selecting a presently displayed media file, one of the keys is used for directly selecting the presently displayed media file, and another key is used for skipping the presently displayed media file. Complete select functions can be executed to a plurality of media files stored in any path by using foregoing three keys. The selected media files are stored in another path as being selected without spending time in actions such as moving, copying, and deleting, etc. Thus, the media file select operation is greatly simplified.

16 Claims, 8 Drawing Sheets

(56) References Cited

U.S. PATENT DOCUMENTS

| | | | |
|---|---|---|---|
| 7,479,949 B2 * | 1/2009 | Jobs et al. | 345/173 |
| 2003/0011596 A1 | 1/2003 | Zhang et al. | |
| 2003/0090472 A1 | 5/2003 | Im | |
| 2004/0075642 A1 | 4/2004 | Kisliakov | |
| 2004/0100486 A1 | 5/2004 | Flamini et al. | |
| 2005/0155086 A1 | 7/2005 | Schick et al. | |

OTHER PUBLICATIONS

Sadun, Erica; Mac Modding Schortcuts, 2005, available at http://web.archive.org/web/20051125155149/http://www.macdevcenter.com/lpt/a/5253/.

iPhoto Getting Started, 2006, Apple Software User's Manual.

* cited by examiner

METHOD AND APPARATUS FOR SELECTING MEDIA FILES

CROSS-REFERENCE TO RELATED APPLICATIONS

The present application is a divisional of U.S. patent application Ser. No. 11/832,655 filed Aug. 2, 2007, now U.S. Pat. No. 8,416,221, which application claims the priority benefit of China application serial no. 200710102630.X, filed Apr. 24, 2007. All such applications are hereby incorporated herein by reference.

FIELD OF THE INVENTION

The present invention generally relates to a method and an apparatus for selecting media files, in particular, to a method and an apparatus for selecting media files with at least three keys.

BACKGROUND OF THE INVENTION

Along with the rapid advancement of information technology, digital electronic products, such as digital cameras and digital video cameras, have been broadly applied in our daily lives. These digital electronic products are usually used for capturing various media files, such as pictures and video files etc. On the other hand, along with the capacity expansion of hard disk and memory, the number of media files stored in a digital electronic product has been increased. Thus, it takes a lot of time and energy for a user to select from a large quantity of media files and adjust the orientations and resolutions of these media files.

For example, the pictures taken with a digital camera may be in different orientations due to different shooting angles (for example, taking landscape or portrait pictures) and have to be adjusted. In addition, the pictures taken usually have various contents and in large quantity due to different shooting environments, techniques, and personal preferences, but the user may want to select and keep only those important or good pictures and delete the others, then the user has to inspect, select, or delete the pictures one by one, which may be very tedious and time-consuming.

Most commonly adopted methods for selecting media files are to adjust and select media files by using buttons in picture viewer software. For example, a media file is selected by clicking the elements, for example, buttons, menus, and toolboxes, in a software interface with a mouse, or the media file may be further rotated, adjusted, deleted, copied, or saved as a new media file (i.e. selected) by pressing down a hotkey on a keyboard (for example, "Ctrl" or "Alt").

For example, two methods are usually used for selecting pictures through picture viewer software, wherein one method is to delete those unwanted pictures, and the other method is to select those needed pictures and save them in another folder. According to the former method, while inspecting the pictures, those unwanted pictures are deleted by pressing down the "Delete" key on the keyboard or a "delete" button on the software interface, and those pictures in wrong orientations are adjusted by pressing down the "rotate left" or "rotate right" button on the software interface. However, according to this method, it is impossible to save all the pictures after some of the pictures are deleted, and it is very time-consuming to press down the "delete" button and the "rotate" buttons repeatedly.

According to the latter method, while inspecting the pictures, similarly, the orientations of pictures are adjusted by pressing down the "rotate" buttons; however, while selecting the pictures, the pictures are copied into another folder by pressing down a "copy" button or by dragging the pictures into the other folder. When the pictures are in large quantity, it is very complicated and time-consuming to perform foregoing actions of "rotate", "copy", and "paste" etc repeatedly.

Additionally, if such a media file selection mechanism is established in a remote operation environment (for example, 10 feet), a remote controller has to be used for selecting the media files. Thus, according to the conventional technique, navigated control is performed through the direction keys on the remote controller in order to select, delete, or rotate the media files, for example, a menu or an option is selected through the direction keys on the remote controller and the menu or the option is entered through an input key on the remote controller, and which is also very complicated and inconvenient.

SUMMARY OF THE INVENTION

Accordingly, the present invention is directed to a method for selecting media files, wherein a media file select function such as "select after rotate", "select directly", or "skip" is performed according to a key input in order to simplify the operation for selecting media files.

The present invention is directed to an apparatus for selecting media files, wherein only three keys are used for selecting, rotating, and skipping media files and the three keys are applied to a remote controller to simplify the operation for remotely selecting media files.

The present invention provides a method for selecting media files. The method is suitable for selecting a plurality of media files by using an input unit. The input unit includes at least a first key, a second key, and a third key. First, one of the media files is displayed, and then whether an input of foregoing keys is received or not is determined. When an input of the first key is received, the presently displayed media file is rotated and selected. When an input of the second key is received, the presently displayed media file is directly selected. When an input of the third key is received, the presently displayed media file is skipped. Finally, whether all the media files have been processed or not is determined, and if there is still unprocessed media file, the next media file is displayed and foregoing steps are repeated until all the media files have been processed.

According to an embodiment of the present invention, the method for rotating the presently displayed media file includes rotating the presently displayed media file 90.degree. anticlockwise or clockwise.

The present invention provides a method for selecting media files. The method is suitable for selecting a plurality of media files by using an input unit, wherein the input unit includes at least a first key, a second key, a third key, a fourth key, and a fifth key. First, one of the media files is displayed, and then whether an input of foregoing keys is received or not is determined. When an input of the first key is received, the presently displayed media file is rotated 90.degree. anticlockwise and is selected. When an input of the second key is received, the presently displayed media file is rotated 90.degree. clockwise and is selected. When an input of the third key is received, the presently displayed media file is directly selected. When an input of the fourth key is received, the presently displayed media file is skipped. When an input of the fifth key is received, a previously displayed media file is returned to and displayed. Finally, whether all the media files have been processed or not are determined, and if there is still unprocessed media file, the next media file is displayed and foregoing steps are repeated until all the media files have been processed.

The present invention provides an apparatus for selecting media files. The apparatus is suitable for selecting a plurality of media files and which includes a display unit and an input unit. The input unit includes a first key, a second key, and a third key. The display unit displays one of the media files. The first key is used for rotating and selecting the presently displayed media file. The second key is used for directly selecting the presently displayed media file. The third key is used for skipping the presently displayed media file.

According to an embodiment of the present invention, the first key is further used for rotating the presently displayed media file 90.degree. anticlockwise or clockwise.

The present invention provides an apparatus for selecting media files. The apparatus is suitable for selecting a plurality of media files and which includes a display unit and an input unit. The input unit includes a first key, a second key, a third key, a fourth key, and a fifth key. The display unit displays one of the media files. The first key is used for rotating the presently displayed media file 90.degree. anticlockwise and selecting it. The second key is used for rotating the presently displayed media file 90.degree. clockwise and selecting it. The third key is used for directly selecting the presently displayed media file. The fourth key is used for skipping the presently displayed media file. The fifth key is used for returning to a previously displayed media file and displaying it.

In the present invention, at least three keys in an input unit are used for selecting media files, wherein one of the keys is used for rotating and selecting a media file, one of the keys is used for directly selecting a media file, and another key is used for skipping a media file. Accordingly, the operation for selecting media files is simplified. In addition, foregoing operation method may also be applied to a general remote controller and the media files can be remotely selected by using the keys on the remote controller conveniently.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
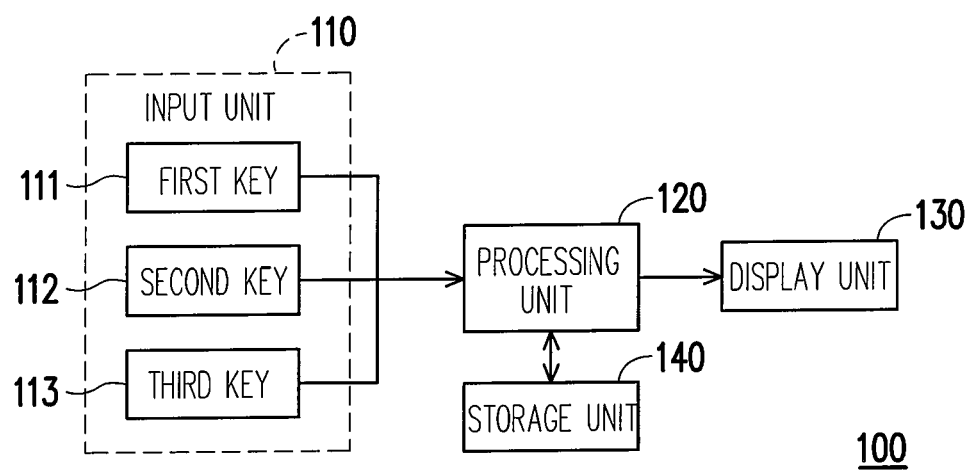
FIG. 1 is a block diagram illustrating an apparatus for selecting media files according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Previously, many complicated steps have to be taken to select media files and save them into a hard disc or CD, and the tools for selecting the media files are limited to mouse and keyboard. Accordingly, to simplify the media file select operation and apply it to a remote controller (for example, used at a distance of 10 feet), the present invention provides a method and an apparatus for selecting media file by using only three keys. Embodiments of the present invention will be described below with reference to accompanying drawings.

FIG. 1 is a block diagram illustrating an apparatus for selecting media files according to an embodiment of the present invention. Referring to FIG. 1, the media file selecting apparatus 100 is used for selecting a plurality of media files, and includes an input unit 110, a processing unit 120, a display unit 130, and a storage unit 140. The input unit 110 may be a keyboard or a remote controller, and includes a first key 111, a second key 112, and a third key 113. The display unit 130 may be a screen. The media files may be text, image, audio, and video files, and the scope thereof is not limited in the present invention.

The processing unit 120 is coupled between the input unit 110 and the display unit 130 for executing a media file selecting function according to an input of the keys (i.e. the first key 111, second key 112, and third key 113) and displaying a next media file on the display unit 130. The select function of each of the keys will be described below.

The first key 111 is used for rotating and selecting the presently displayed media file. The content of a media file may be a portrait or a landscape, and the media file has to be adjusted in its orientation to allow a user to view the media file conveniently in the display unit 130. To be specific, the processing unit 120 rotates the presently displayed media file 90.degree. anticlockwise or clockwise when it receives an input of the first key 111, wherein the rotation direction is predetermined according to the habit of the user. For example, a picture displayed in the display unit 130 is in an orientation rotated 90.degree. clockwise if the user is accustomed to taking portrait pictures by rotating the digital camera 90.degree. anticlockwise, thus, the first key 111 has to be set for rotating the picture 90.degree. anticlockwise so as to display the picture uprightly.

The second key 112 is used for directly selecting the presently displayed media file. To be specific, when the processing unit 120 receives an input of the second key 112, which means the user wants to keep the presently displayed media file, the presently displayed media file is then directly selected.

The third key 113 is used for skipping the presently displayed media file. To be specific, when the processing unit 120 receives an input of the third key 113, which means the user does not want to select the presently displayed media file, the presently displayed media file is skipped and no selection action is performed.

The storage unit 140 is used for storing the original media files and the selected media files, wherein the selected media files may be the media files rotated and selected through inputs of the first key 111 or the media files directly selected through inputs of the second key 112.

It should be mentioned that since the media file selecting apparatus 100 can select media files with only three keys, the media file selecting apparatus 100 can be applied to a remote controller, for example, a remote controller of the Microsoft Media Centre Edition (MCE), wherein the "leftward", "downward", and "OK" buttons on the remote controller may be used as foregoing first key 111, second key 112, and third key 113 for executing select functions of the media files, so that the media file selecting operation can be performed remotely.

Figure 2:
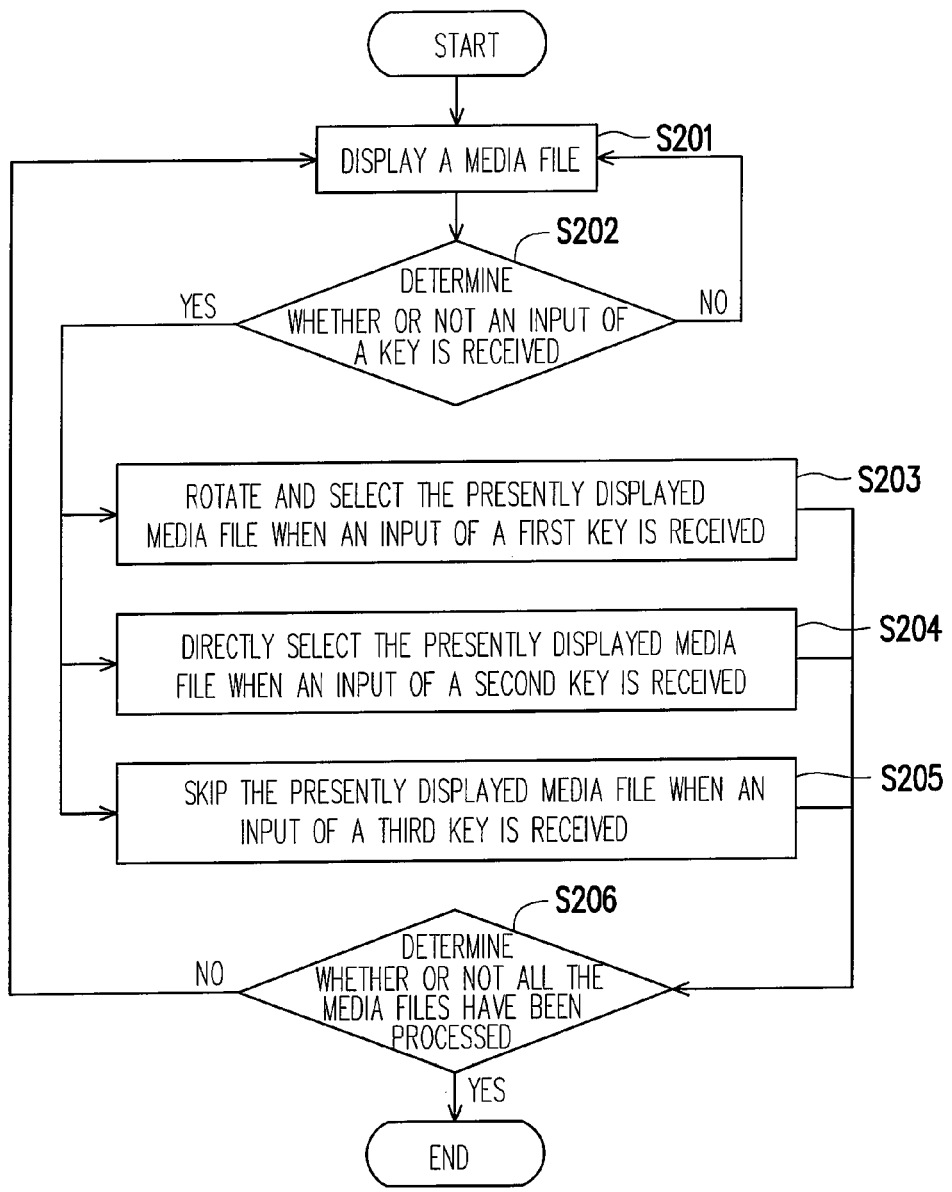
FIG. 2 is a flowchart illustrating a method for selecting media files according to an embodiment of the present invention.

The present invention further provides a method for selecting media files along with the media file selecting apparatus 100 described in foregoing embodiment. FIG. 2 is a flowchart illustrating a method for selecting media files according to an embodiment of the present invention. Referring to both FIG. 1 and FIG. 2, first, in step S201, the processing unit 120 reads the original media files from the storage unit 140 and sends the original media files to the display unit 130 to be displayed, so that the user can inspect and decide which media files to be selected.

Next, in step S202, the processing unit 120 determines whether or not an input of the keys (i.e. the first key 111, second key 112, or third key 113) is received, and when a key input is received, the processing unit 120 executes a corresponding selecting function according to the received key input. The following steps S203.about.S205 are respectively corresponding to the actions executed when various key inputs are received.

In step S203, when an input of the first key 111 is received, the presently displayed media file is rotated and then selected, and the rotated media file is stored into the storage unit 140. For example, digital pictures are usually taken in landscape orientation. If a picture is taken with the camera rotated 90.degree., the picture displayed in the display unit 130 is also rotated 90.degree. Then the picture is rotated to an upright orientation and stored into the storage unit 140 when the processing unit 120 receives an input of the first key 111.

In step S204, when an input of the second key 112 is received, the presently displayed media file is directly selected, and the selected media file is stored into the storage unit 140. In other words, when the user sees the presently displayed media file is displayed upright and wants to select the media filed, the user directly selects and saves the media file by only pressing down the second key 112.

In step S205, when an input of the third key 113 is received, the presently displayed media file is skipped but not selected or saved into the storage unit 140. For example, the user can skip the presently displayed media file by pressing down the third key 113 if the user finds the presently displayed media file is undesirable, and then the user continues to process the next picture.

It should be mentioned here that while the display unit displays a media file, the processing unit 120 further determines whether or not the presently displayed media file is a video file or an audio file. If the presently displayed media file is a video file or an audio file, the presently displayed media file is directly selected when an input of the first key 111 or the second key 112 is received since it is not necessary to rotate a video or an audio file. Besides, while performing the selecting functions, the processing unit 120 may further adjust the resolution of the presently displayed media file to be a predetermined resolution in order to unify the display size of each media file.

Finally, in step S206, the processing unit 120 determines whether or not all the media files have been processed. If there is still unprocessed media file, the procedure returns to step S201 to display the next media file and foregoing steps S202.about.S205 are repeated until all the media files are processed.

Figure 3:
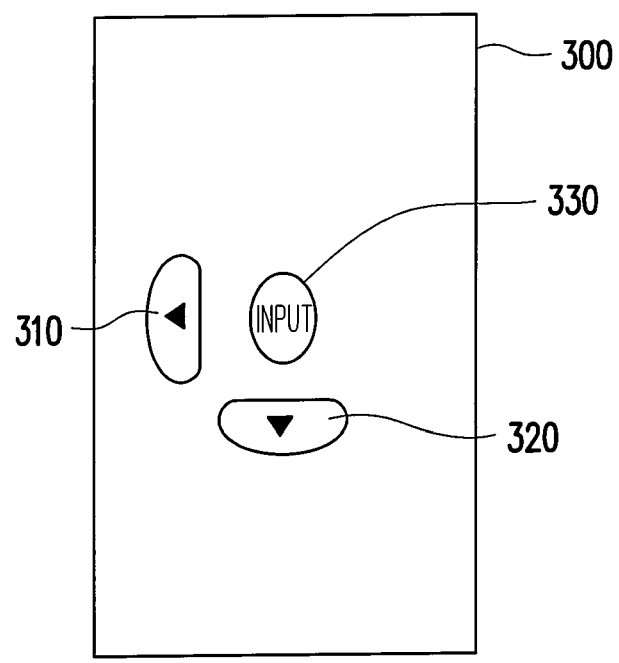
FIG. 3 is a diagram of a remote controller according to an embodiment of the present invention.

In addition, since the media file selecting method described above can be implemented with only three keys, the method can be applied to a control apparatus with only a few keys, such as a remote controller. FIG. 3 is a diagram of a remote controller according to an embodiment of the present invention. Referring to both FIG. 1 and FIG. 3, the remote controller 300 includes a leftward key 310, a downward key 320, and an input key 330, and these keys respectively correspond to the first key 111, second key 112, and third key 113 in foregoing embodiment.

A user may execute the "rotate", "skip", and "select" functions through the leftward key 310, downward key 320, and input key 330. If the presently displayed media file is not displayed upright, the user can rotate the presently displayed media file to upright by pressing down the leftward key 310. Here the rotated media file is saved into the storage unit 140, and meanwhile, the next media file is displayed in the display unit 130. The rotation direction of the leftward key 310 may be preset according to the habit of the user.

Moreover, if the presently displayed media file is displayed upright, the user can directly select the presently displayed media file and save it into the storage unit 140 by pressing down the input key 330, and then the next media file is displayed. If the user does not want to select the presently displayed media file, the user can forward to the next media file by pressing down the downward key 320, and then the presently displayed media file is not saved into the save path.

It should be noted that the leftward key 310, downward key 320, and input key 330 in the present embodiment are only used for the convenience of description, and the keys used as the first key 111, second key 112, and third key 113 in the media file selecting apparatus 100 are not limited in the present invention.

Figure 4:
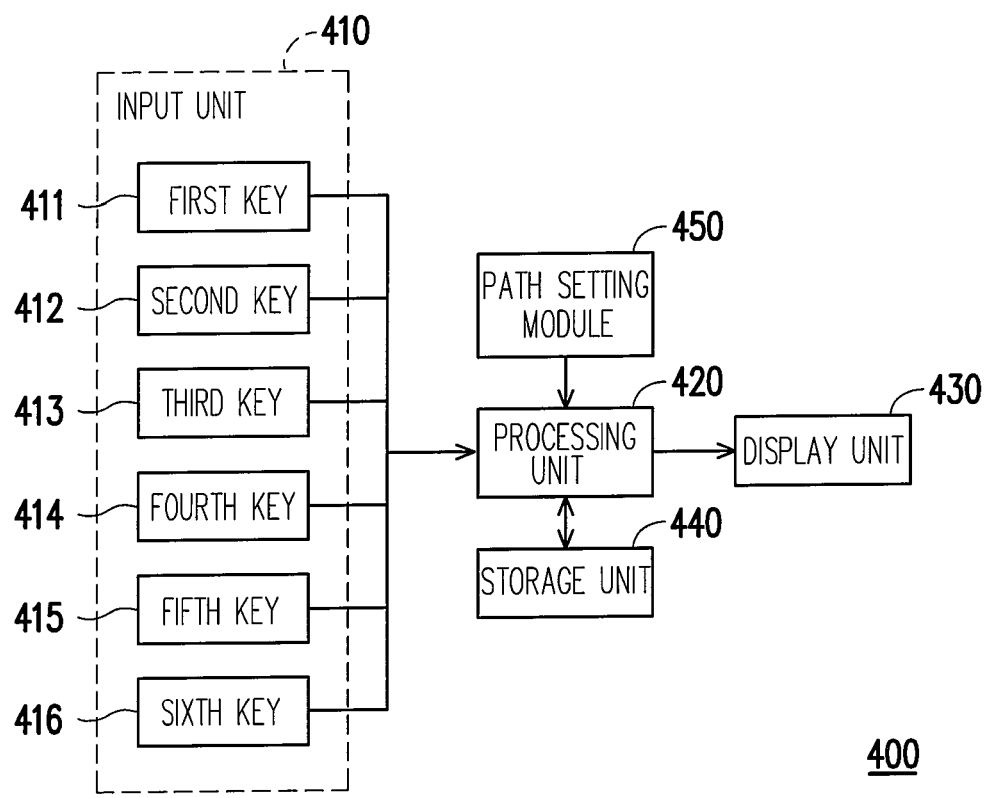
FIG. 4 is a block diagram illustrating an apparatus for selecting media files according to another embodiment of the present invention.

In another embodiment of the present invention, five keys are used for selecting media files. FIG. 4 is a block diagram illustrating an apparatus for selecting media files according to this embodiment of the present invention. Referring to FIG. 4, the media file selecting apparatus 400 includes an input unit 410, a processing unit 420, a display unit 430, a storage unit 440, and a path setting module 450. The input unit 410 includes a first key 411, a second key 412, a third key 413, a fourth key 414, a fifth key 415, and a sixth key 416. The dispositions and functions of the processing unit 420, the display unit 430, and the storage unit 440 are the same as or similar to the processing unit 120, the display unit 130, and the storage unit 140 in foregoing embodiment, such that the relative description is omitted herein.

In the present embodiment, the first key 411 and the second key 412 are respectively used for rotating the presently displayed media file 90.degree. anticlockwise and clockwise and saving the rotated media file into the storage unit 440. The third key 413 is used for directly selecting the presently displayed media file and saving it into the storage unit 440. The fourth key 414 is used for skipping the presently displayed media file. After each of foregoing keys is pressed down, besides executing the corresponding selecting function, a next media file is further displayed in the display unit 430. Besides, the fifth key 415 is used for returning to the previously displayed media file.

Additionally, the media file selecting apparatus 400 further includes the sixth key 416 for enabling the keys of the input unit 410 (i.e. the first key 411, second key 412, third key 413, fourth key 414, and fifth key 415) to provide the functions for selecting media files. Originally, the first key 411, second key 412, third key 413, fourth key 414, and fifth key 415 may have their own functions, and in the present invention, these keys are enabled by pressing down the sixth key 416 so that they can provide the media file selecting functions.

The path setting module 450 is used for setting a read path of the original media files and a save path for saving the selected media files. For example, a particular data folder in the storage unit 440 is set as the read path, and another data folder in the storage unit 440 is set as the save path, wherein the read path is used for reading the original media files, and the save path is used for storing the selected media files.

Figure 5:
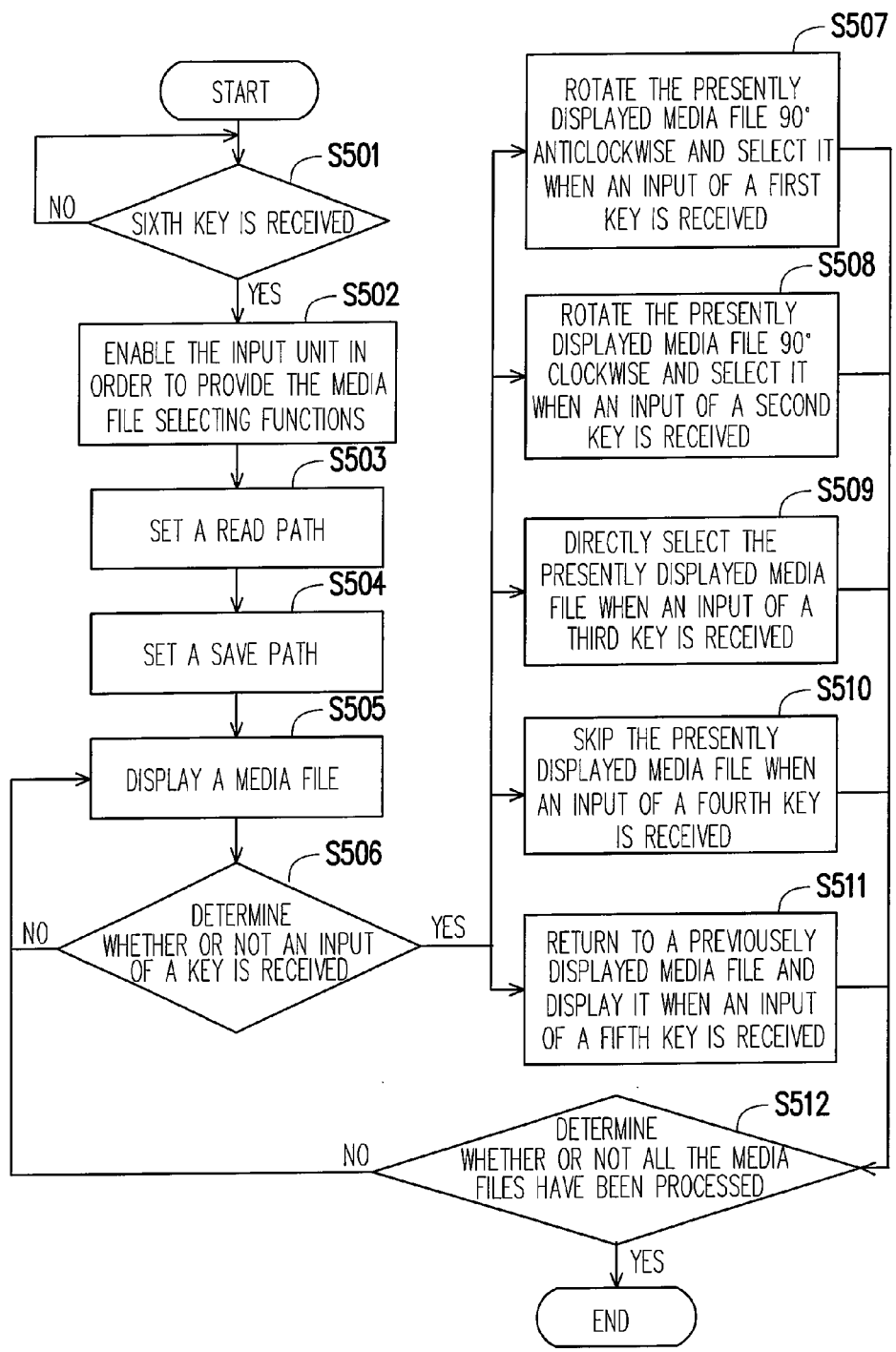
FIG. 5 is a flowchart illustrating a method for selecting method files according to another embodiment of the present invention.

Similarly, the present invention also provides a method for selecting media files corresponding to the media file selecting apparatus 400 described above. FIG. 5 is a flowchart illustrating a method for selecting method files according to another embodiment of the present invention. Referring to FIG. 4 and FIG. 5, first, in step S501, the processing unit 420 determines whether or not an input of the sixth key 416 is received. If the input of the sixth key 416 is received, step S502 is executed to enable the input unit 410 and to provide the functions for selecting media files. In other words, the keys of the input unit 410 (i.e. the first key 411, second key 412, third key 413, fourth key 414, and fifth key 415) are only given the media file selecting functions when the input of the sixth key 416 is received. The step S502 is only executed until the input of the sixth key 416 is received.

After the input unit 410 is enabled, in step S503, a read path is set by the path setting module 450 so that the processing unit 420 can read media files from the storage unit 440 according to this read path. In addition, in step S504, a save path is set by the path setting module 450 so that the processing unit 420 can store those selected media files into the storage unit 440 according to this save path.

Next, in step S505, the processing unit 420 reads the media files from the storage unit 440 according to the read path and displays the media files in the display unit 430. After that, in step S506, the processing unit 420 determines whether or not an input of the keys (i.e. the first key 411, second key 412, third key 413, fourth key 414, and fifth key 415) is received and performs corresponding select function according to the received key input. Steps S507.about.S511 are the selecting operations corresponding to various key inputs, which are similar to those described in foregoing embodiment, and therefore the relative description is omitted herein.

Finally, after the corresponding selecting function is performed, the processing unit 420 determines whether or not all the media files have been processed in step S512. If there is still unprocessed media file, the procedure returns to step S505 to display the next media file and foregoing steps S506.about.S511 are repeated until all the media files are processed.

It should be mentioned that in the present embodiment, the user can return to a previously displayed media file through the input of the fifth key 415 and perform the selecting functions to the previously displayed media file again, which means the present invention has fault-tolerant function. When the user presses down a wrong key accidentally (for example, skips a media file by pressing down the fourth key 414 accidentally), the user can conveniently return to the previously displayed media file by pressing down the fifth key 415.

Figure 6:
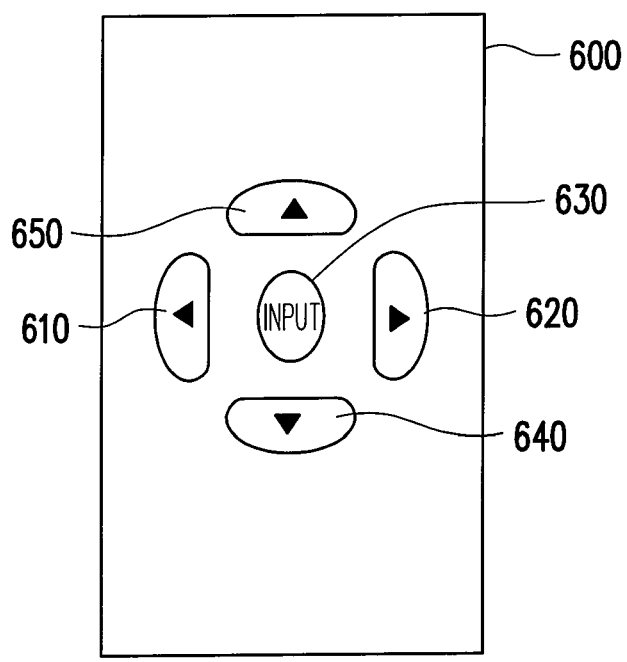
FIG. 6 is a diagram illustrating a remote controller according to another embodiment of the present invention.

Moreover, the foregoing media file selecting method may also be applied to a control apparatus with only a few keys, such as a remote controller. FIG. 6 is a diagram illustrating a remote controller according to another embodiment of the present invention. Referring to both FIG. 4 and FIG. 6, the remote controller 600 includes a leftward key 610, a rightward key 620, an input key 630, a downward key 640, and an upward key 650, and these keys respectively correspond to the first key 411, second key 412, third key 413, fourth key 414, and fifth key 415 in foregoing embodiment.

When the orientation of the presently displayed media file is rotated 90.degree. clockwise, a user can press down the leftward key 610 to rotate the presently displayed media file 90.degree. anticlockwise and save the rotated media file into the storage unit 440, and meanwhile, the display unit 430 displays the next media file. Similarly, when the orientation of the presently displayed media file is rotated 90.degree. anticlockwise, the use can press down the rightward key 620 to rotate the presently displayed media file 90.degree. clockwise and save the rotated media file into the storage unit 440, and then the next media file is displayed.

Besides, if the presently displayed media file is displayed upright, the user can press down the input key 630 to directly select the presently displayed media file and save it into the storage unit 440, and then the next media file is displayed.

If the user does not want to select the presently displayed media file, the user can press down the downward key 640 to forward to the next media file, and here the presently displayed media file is not saved into the save path. Besides, when the user realizes that the previous select operation is incorrect or wants to re-select the previous media file, the user can press down the upward key 650 to return to the previously displayed media file and re-perform the media file select functions.

It should be mentioned here that besides performing the media file selecting functions by using the four direction keys and the input key, the functions may also be performed by using the control elements (for example, buttons, menus, and toolboxes) in a user interface.

Figure 7A:
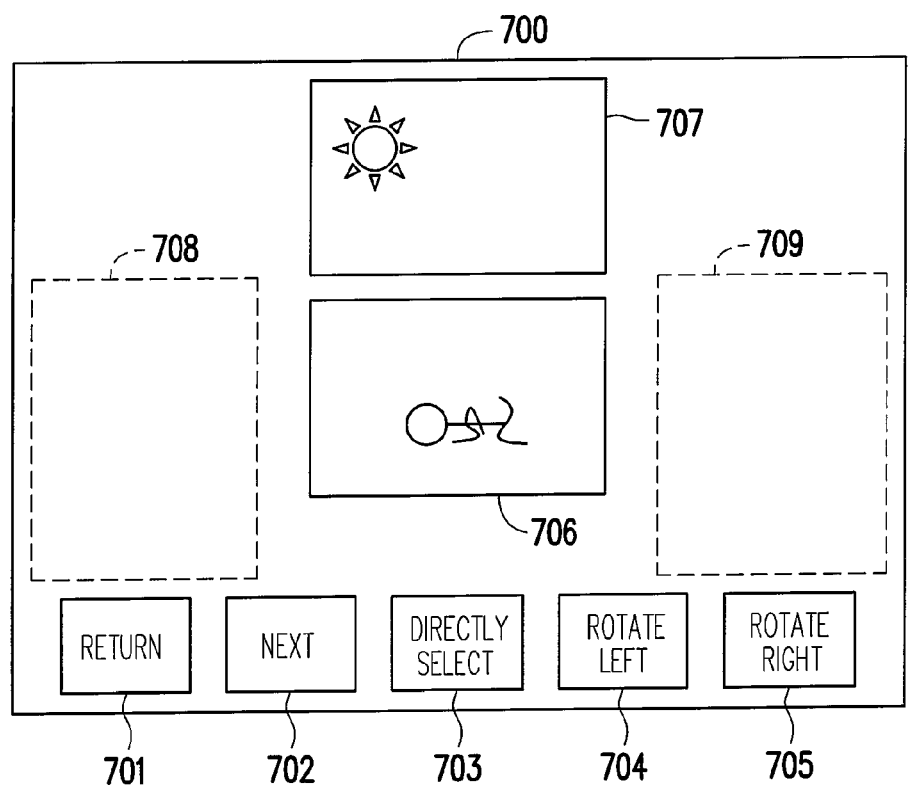
FIGS. 7A and 7B are diagrams illustrating a user interface according to an embodiment of the present invention.
Figure 7B:
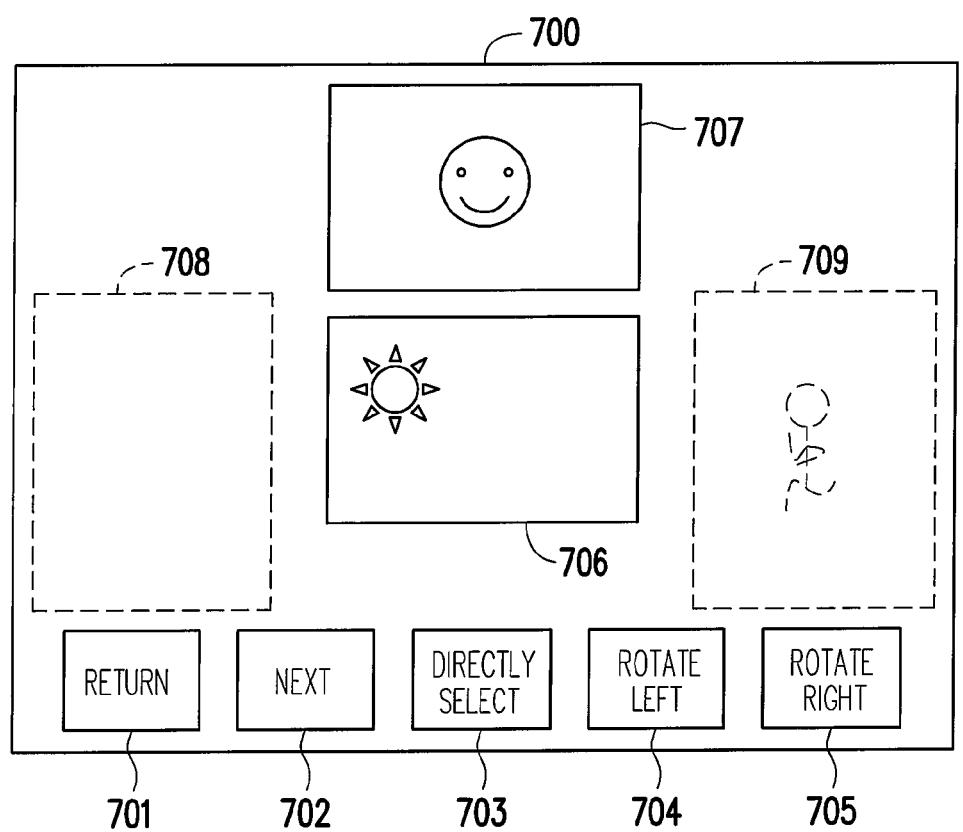

FIGS. 7A and 7B are diagrams of a user interface according to an embodiment of the present invention. Referring to both FIG. 7A and FIG. 7B, the user interface 700 includes buttons 701.about.705, and these buttons may be used for executing the select functions of the upward key 650, downward key 640, input key 630, leftward key 610, and rightward key 620 in foregoing embodiment.

In the present embodiment, the user interface 700 includes a pending zone 706 and a preview zone 707, and the regions 708 and 709 surrounded by dotted lines besides the pending zone 706 are respectively used for displaying the media files rotated anticlockwise and clockwise.

As shown in FIG. 7A, the picture in the pending zone 706 is not displayed upright, so that the user clicks at the "rotate right" button 705 to rotate the picture 90.degree. clockwise, and the rotated picture is displayed in the region 709 (as shown in FIG. 7B). In addition, the picture originally in the preview zone 707 is moved downwards into the pending zone 706, and a next picture is then displayed in the preview zone 707.

As shown in FIG. 7B, the picture in the pending zone 706 is displayed upright, and if the user wants to select the picture, the user can click at the "directly select" button 703 to select the picture; otherwise if the user does not want to select the picture, the user can click at the "next" button 702 to skip the picture. After the picture in the pending zone 706 is selected or skipped, similarly, the picture in the preview zone 707 is moved downwards into the pending zone 706, and subsequent selecting operation is repeated as described above.

In summary, the method and the apparatus for selecting media files provided by the present invention have at least following advantages:

1. Only three keys are used for selecting, rotating, and skipping media files, therefore the media file selecting operation is simplified.

2. A simple user interface is used for displaying a pending picture, a next picture, and a rotated picture, so that a user can select the media files conveniently.

3. The method provided by the present invention can be applied to an input apparatus with only a few keys, such as a remote controller, so that the media files can be selected remotely and the operating procedure can be simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of transferring media files comprising:
displaying a media file of the media files stored in a first storage location upon a device comprising a display and an input unit comprising a first key, a second key, a third key, a fourth key, and a fifth key;
determining whether one of the first key, the second key, the third key, the fourth key, and the fifth key of the input unit is selected;
rotating the presently displayed media file 90 degrees anticlockwise and processing the presently displayed media file when an input of the first key is received;
rotating the presently displayed media file 90 degrees clockwise and processing the presently displayed media file when an input of the second key is received;
directly processing the presently displayed media file when an input of the third key is received;
skipping the presently displayed media file when an input of the fourth key is received;
returning to a previously displayed media file and displaying the previously displayed media file when an input of the fifth key is received;
processing the presently displayed media file by at least of selecting it and storing it in a second storage location;
determining whether or not all the media files have been processed, wherein
upon determining there is still an unprocessed media file, a next media file is displayed and foregoing steps are repeated until all the media files have been processed; and
upon determining there is no unprocessed media file and processing previously displayed media files comprised selecting them storing the selected media files in the second storage location.

2. The media file selecting method according to claim 1, wherein before displaying the media file, the method further comprises determining whether or not an input of a sixth key is received, wherein if the input of the sixth key is received, the input unit is enabled to provide functions for selecting the media files.

3. The media file selecting method according to claim 1, wherein before displaying the media file, the method further comprises setting a read path for the first storage location.

4. The media file selecting method according to claim 1, wherein before displaying the media file, the method further comprises setting a save path for the second storage location.

5. The media file selecting method according to claim 1, wherein after selecting the presently displayed media file, the method further comprises adjusting the resolution of the presently displayed media file to be a predetermined resolution.

6. The media file selecting method according to claim 1, wherein
after displaying the media file, the method further comprising: determining whether or not the presently displayed media file is a video file or an audio file, wherein if the presently displayed media file is a video file or an audio file, the presently displayed media file is directly selected but not rotated when an input of the first key or the second key is received.

7. The media file selecting method according to claim 1, wherein
the media files comprise text, image, audio, or video files.

8. The media file selecting method according to claim 1, wherein
the input unit comprises a keyboard or a remote controller.

9. The method according to claim 1, wherein
the input device is either separate from the display or rendered as part of the display which is part of a human-computer interface.

10. A device comprising:
a display;
an input unit comprising a first key, a second key, a third key, a fourth key, and a fifth key;
a processor for executing executable instructions;
a non-transitory memory for storing executable instructions for providing a process relating to transferring media files, the process comprising the steps of:
displaying a media file of the media files stored in a first storage location upon a device comprising a display and an input unit comprising a first key, a second key, a third key, a fourth key, and a fifth key;
determining whether one of the first key, the second key, the third key, the fourth key, and the fifth key of the input unit is selected;
rotating the presently displayed media file 90 degrees anticlockwise and processing the presently displayed media file when an input of the first key is received;
rotating the presently displayed media file 90 degrees clockwise and processing the presently displayed media file when an input of the second key is received;
directly processing the presently displayed media file when an input of the third key is received;
skipping the presently displayed media file when an input of the fourth key is received;
returning to a previously displayed media file and displaying the previously displayed media file when an input of the fifth key is received;
processing the presently displayed media file by at least of selecting it and storing it in a second storage location;
determining whether or not all the media files have been processed, wherein
upon determining there is still an unprocessed media file, a next media file is displayed and foregoing steps are repeated until all the media files have been processed; and
upon determining there is no unprocessed media file and processing previously displayed media files comprised selecting them storing the selected media files in the second storage location.

11. The device according to claim 10, wherein
prior to displaying the media file, the process further comprises determining whether or not an input of a sixth key is received, wherein if the input of the sixth key is received, the input unit is enabled to provide functions for selecting the media files.

12. The device according to claim 10, wherein
after displaying the media file, the process further comprising: determining whether or not the presently displayed media file is a video file or an audio file, wherein if the presently displayed media file is a video file or an audio file, the presently displayed media file is directly selected but not rotated when an input of the first key or the second key is received.

13. The device according to claim 10, wherein
the input unit is predetermined regions of the display; and
the display is part of a human-computer interface.

14. Executable instructions stored upon a non-volatile, non-transitory memory, the executable instructions for providing a process relating to transferring media files comprising the steps of:
displaying a media file of the media files stored in a first storage location upon a device comprising a display and an input unit comprising a first key, a second key, a third key, a fourth key, and a fifth key;
determining whether one of the first key, the second key, the third key, the fourth key, and the fifth key of the input unit is selected;
rotating the presently displayed media file 90 degrees anti-clockwise and processing the presently displayed media file when an input of the first key is received;
rotating the presently displayed media file 90 degrees clockwise and processing the presently displayed media file when an input of the second key is received;
directly processing the presently displayed media file when an input of the third key is received;
skipping the presently displayed media file when an input of the fourth key is received;
returning to a previously displayed media file and displaying the previously displayed media file when an input of the fifth key is received;
processing the presently displayed media file by at least of selecting it and storing it in a second storage location;
determining whether or not all the media files have been processed, wherein
upon determining there is still an unprocessed media file, a next media file is displayed and foregoing steps are repeated until all the media files have been processed; and
upon determining there is no unprocessed media file and processing previously displayed media files comprised selecting them storing the selected media files in the second storage location.

15. The executable instructions according to claim 14, wherein
prior to displaying the media file, the process further comprises determining whether or not an input of a sixth key is received, wherein if the input of the sixth key is received, the input unit is enabled to provide functions for selecting the media files.

16. The executable instructions according to claim 14, wherein
after displaying the media file, the process further comprising: determining whether or not the presently displayed media file is a video file or an audio file, wherein if the presently displayed media file is a video file or an audio file, the presently displayed media file is directly selected but not rotated when an input of the first key or the second key is received.

* * * * *